Patented Aug. 1, 1950

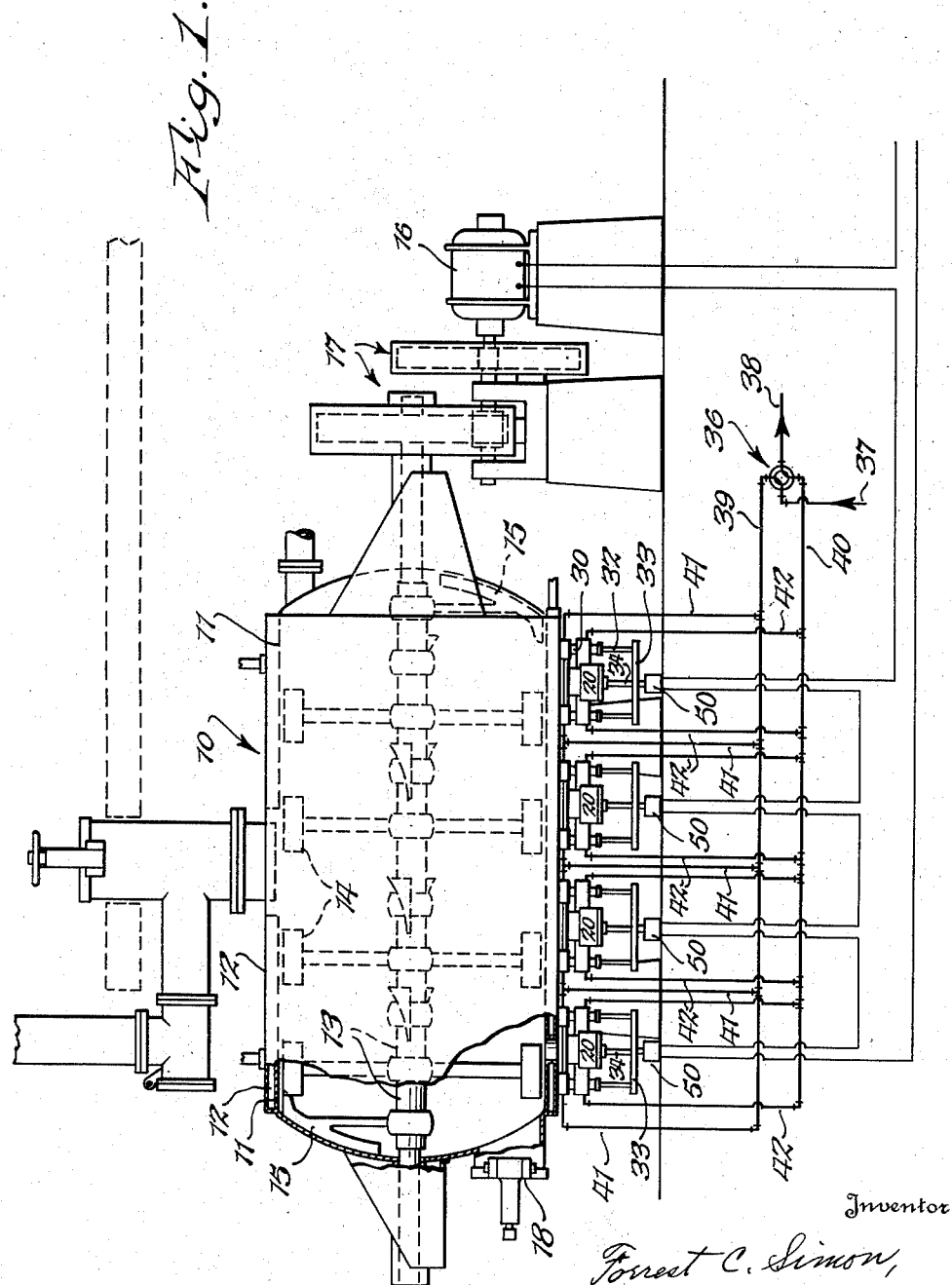

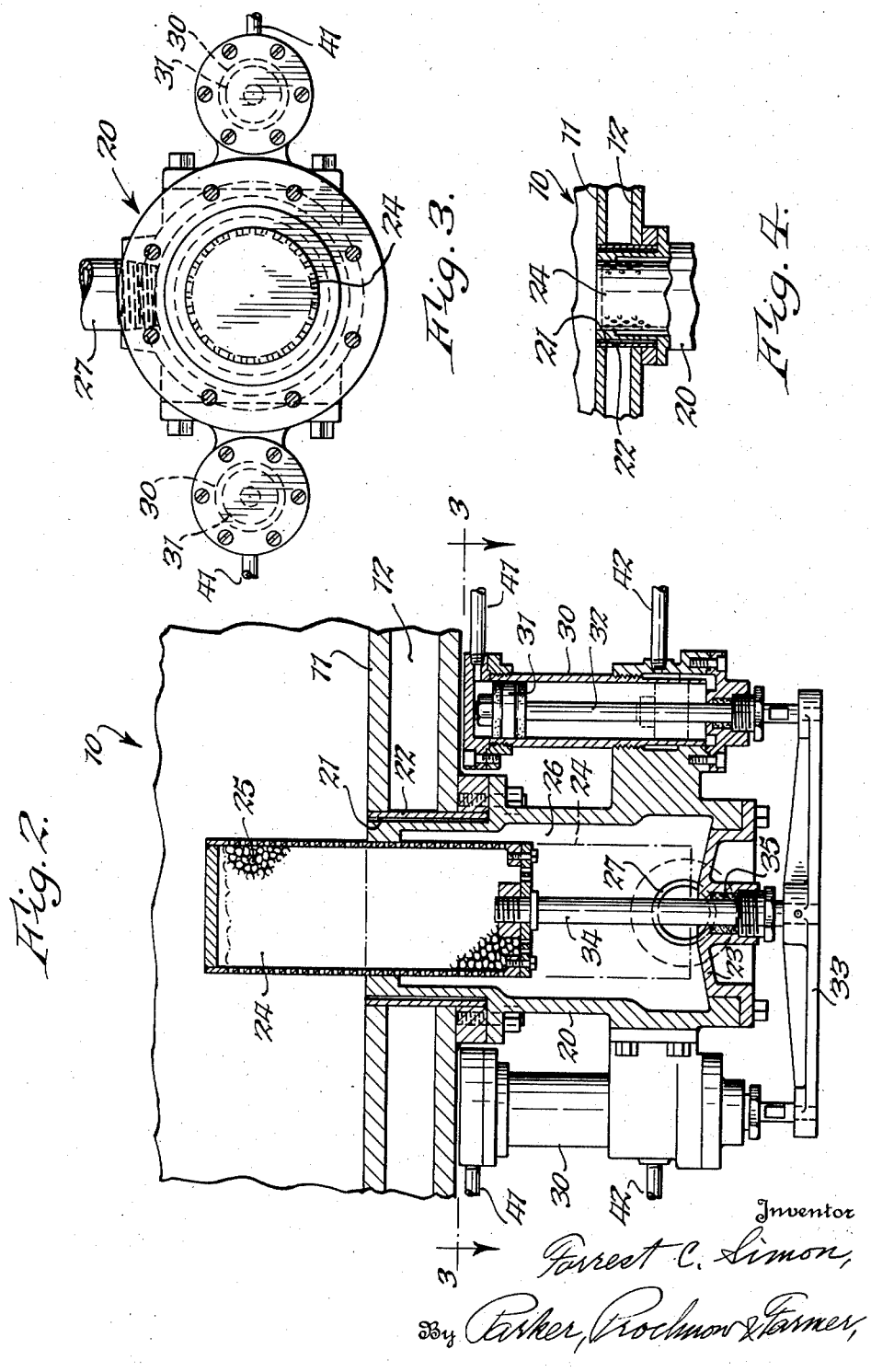

2,517,040

UNITED STATES PATENT OFFICE 2,517,040

FILTER AND DISCHARGE VALVE FOR SOLVENT EXTRACTORS

Forrest C. Simon, Piqua, Ohio, assignor to The French Oil Mill Machinery Company, Piqua, Ohio Application September 20, 1946, Serial No. 698,087

13 Claims. (Cl. 23—267)

This invention relates to improvements in take-off strainers or filters for solvent rendering cookers or extractors which are used for the extraction of tallow, grease and oil from materials such as shop scrap, cracklings, carcasses, slaughter house offal and other grease or oil-bearing products.

A well known type of solvent rendering cooker or extractor which has been used for some years for such purposes comprises a container in the form of a horizontal steam-jacketed cylinder in which the oil-bearing material is heated or cooked by means of steam introduced in the steam jacket, a rotary agitator for stirring the material during treatment thereof, and a take-off strainer at the bottom of the container through which a suitable solvent for the tallow, grease or oil may be introduced into the container and through which the mixed tallow, oil or grease and solvent, commonly called "miscella," is drained off before the waste material, from which the miscella has been recovered, is discharged from the extractor. In the use of such extractors, the comminuted oil-bearing material, which may be raw or may have been previously processed more or less, is introduced into the extractor and heated or cooked to the required condition, the agitator being driven to ensure uniform heating of the material. The solvent is then pumped into the extractor, preferably through the take-off strainer, and is thoroughly mixed with the material by operating the agitator for a few minutes. This procedure is called "washing." The miscella, or mixed solvent and tallow, grease or oil, is then pumped out of the extractor through the take-off strainer, after which the residue or waste material is discharged through a suitable outlet from the extractor container.

The take-off strainers of such extractors used previous to this invention have been very inefficient and much time has been consumed in pumping the solvent into and pumping the miscella out of the extractor. Such take-off strainers or filters, as usually employed heretofore, comprise a casing depending from the bottom of the extractor and containing a filter bed or body of gravel or analogous material for filtering the heavy or solid material out of the miscella and having a perforated plate flush with the floor of the extractor through which the miscella discharges from the interior of the extractor into the filtering body of the strainer. Means have been previously provided for closing the perforations of this plate or shutting off communication between the extractor and the strainer to prevent discharge of particles of the oil-bearing material into the strainer and clogging it during the heating or cooking and washing treatments of the material, at which times the agitator is operated for stirring or mixing the material. But even with such provision, so much time has been required for the washing operation, or introducing the solvent or miscella into and withdrawing the miscella from the extractor as to materially impede the extraction operation and greatly reduce the capacity of the extractors.

One object of my invention is to provide an improved take-off strainer for cookers of extractors of the sort mentioned which will greatly accelerate the washing operation, or the introduction and withdrawal of the solvent or miscella into and from the container, and thus save valuable time in the operation of the extractors with resulting increased capacity thereof.

Other objects of the invention are to provide a novel take-off strainer for solvent rendering cookers or extractors which will effectually prevent clogging of the strainer and which will have a materially greater drainage capacity than strainers of previous constructions; in which the filtering material of the strainer is contained in a perforated holder which, during the heating or washing treatment of the material, is positioned below or outside of the extractor container and shut off therefrom so as not to interfere with the operation of the material agitator, but which is movable into the mass of material in the interior of the container, to thereby materially increase the drainage area of the strainer through which the miscella can discharge from the container into the strainer; also to provide means for preventing interference with or injury to the strainer or agitator in the use of the extractor.

Further objects and advantages of the invention will appear from the following specification of the preferred embodiment of the invention shown in the accompanying drawings, and the novel features of the invention are set forth in the appended claims.

In said drawings:

Fig. 1 is a side elevation, on a reduced scale, of a cooker or extractor equipped with take-off strainers embodying the invention.

Fig. 2 is an enlarged fragmentary longitudinal sectional elevation thereof showing one of the take-off strainers with its operating means.

Fig. 3 is a horizontal section on line 3—3, Fig. 2, showing the take-off strainer in plan.

Fig. 4 is a fragmentary vertical section of the take-off strainer, on a reduced scale, showing it in its lower or withdrawn position.

10 represents the extractor which, as shown, is of known type, comprising a horizontally arranged, hollow cylindrical container 11 forming a treating chamber and surrounded by a steam jacket 12, to which steam is suitably supplied for cooking or treating the oil-bearing material in the container. The extractor is equipped with an agitator which, as usual, may comprise a central shaft 13 extending axially through the container and provided with radial arms carrying stirrer blades or scrapers 14 arranged to rotate close to the cylindrical wall of the container, and end scrapers or blades 15 arranged to scrape the end walls of the container. The blades 14 may have faces disposed obliquely in one direction relatively to the length of the container so as to act, by rotation of the agitator in one direction, to move the material in the container toward one end thereof. The agitator may be driven by suitable means, such for instance, as an electric motor 16 operatively connected by reduction gearing 17 to one end of the agitator shaft. In the operation of the extractor, the material in the container is stirred by rotation of the agitator during the heating and washing of the material, and after completion of the extraction treatment and withdrawal of the miscella, the residue or waste material may be discharged from the container through the usual discharge door 18 at one end of the container by rotation of the agitator in the appropriate direction to move the material toward the discharge door.

The take-off strainer, of which any suitable number, one or more, may be provided on the extractor, as shown, has an outer casing 20, preferably of cylindrical form which is bolted or otherwise suitably fixed to and depends from the bottom of the container, with the open, upper end of the casing communicating with the interior of the treating chamber of the container through an opening 21 which may be formed by a sleeve 22 passing through the steam jacket 12. The bottom of the casing may be closed, as by an end plate 23 removably bolted to the lower end of the body of the casing. Within the strainer casing 20 is a tubular or cylindrical holder or basket 24 with perforated side and bottom walls which is filled with gravel or other suitable filtering material 25. This holder 24 is movable from a lower position, shown in Fig. 4, in the casing 20 to a raised position shown in Fig. 2, in which the filter holder projects up through the open end of the casing 20 into the treating chamber. The holder 24 has an imperforate or solid upper end wall which, in the lower or outer position of the holder is flush with the floor of the treating chamber and closes the open upper end of the strainer casing, and so prevents discharge of miscella or material from the treating chamber into the strainer casing. In its upper or inner position the filter holder extends for a substantial portion of its length up into the treating chamber and into the material therein, thus exposing the perforations in its tubular wall for the passage therethrough of the solvent into said chamber and for the discharge of the miscella therefrom through the bed of filtering material in the holder. The strainer casing 20 provides an annular chamber 26 surrounding the perforated tubular wall of the filter holder 24 through which and a connecting pipe 27 the solvent can be pumped or introduced through the filter into the cooker, and through which and said pipe the miscella can be pumped or withdrawn from the treating chamber. When the filter holder is in its lower position with its upper end flush with the floor of the treating chamber, it will be out of the path of movement of the rotary agitator and will not interfere with the operation thereof during the treatment of the material. After the cooking or treatment of the material is completed the agitator is stopped and the filter holder is moved to its upper position in which it projects up into the treating chamber for the washing operation or the introduction of the solvent and the withdrawal of the miscella from the chamber.

The filter holder may be moved to and from its operative position within the cooking chamber by suitable actuating means which, as shown, comprise two hydraulic cylinders 30 for each take-off strainer, suitably supported as on the strainer casing 20 at opposite sides thereof, and pistons 31 arranged to reciprocate in the cylinders and having piston rods 32 connected at their outer ends by a yoke or cross bar 33 which is connected to the filter holder 24, as by a rod or stem 34, passing through a suitable stuffing box 35 in the lower end of the strainer casing 20. The pistons are reciprocated in the cylinders 30 by admitting liquid under pressure to the cylinders at one end thereof and discharging the liquid from the opposite end of the cylinders, the liquid being admitted to the upper ends of the cylinders for lowering the filter holder 24 and to the lower ends of the cylinders for raising the filter holder to its upper or inner position. Any known or suitable controlling valve and pipe connections for this purpose may be employed. As shown more or less schematically in Fig. 1, the pressure liquid may be delivered to and discharged from the actuating cylinders for the several filter holders by means of a four-way control valve 36 connected between liquid supply and discharge pipes 37 and 38 and pipe lines 39 and 40, the former of which connects by branch pipes 41 to the upper ends of the two cylinders for each filter holder, and the latter of which connects by branch pipes 42 to the lower ends of the two cylinders 30 for each filter holder. Thus, by appropriate operation of the valve 36, the pressure liquid is admitted to and discharged from the actuating cylinders for the several filter holders simultaneously to move the holders, as required, either to their inoperative lower positions or to their operative upper positions to which latter position they are moved for introduction and discharge of the solvent and miscella into and from the treating chamber of the extractor. The distance to which the filter holders are projected up into the chamber of the container is determined by the length of stroke of their actuating pistons, said distance in the extractor as illustrated in the drawings being approximately 8 inches. This distance of projection of the filter holder up into the material in the treating chamber gives approximately six to seven times the drainage capacity over preforms of take-offs. The distance can be increased or decreased as desired.

With the improved take-off strainer as herein disclosed, the time of washing the material and discharging the miscella can be cut down very considerably. For example, it takes approximately thirty to sixty minutes to make one wash with the take-offs heretofore used, while it can be done with this construction in about one-half of that time, thus effecting a valuable saving of time in operation of the extractor, since by the improved construction the filter holder can be extended well up into the material so that drainage can take place higher up in the material, and thereby greatly increasing the drainage rate.

Preferably suitable means are provided for preventing operation of the agitator when the filter holders project up into the treating chamber, to thereby prevent possible damage or injury to the take-off strainers or the agitator. The means, as illustrated schematically in Fig. 1, for this purpose, comprises switches 50 connected in series with the main control switch or device for the driving motor 16 for the agitator, and associated one in relation to each filter holder 24, so that all of the filter holders will have to be withdrawn fully to their lowermost positions, out of the path of movement of the agitator, before the motor 16 can be started to rotate the agitator. Switch or other control means for this purpose, of any other known or suitable type could be employed.

I claim as my invention:

1. The combination with a chamber in which material is treated for extracting liquid therefrom, of a casing exterior to said treating chamber and having an open end communicating with said chamber, a hollow holder containing filtering material for said liquid and having an imperforate inner end and a perforate wall, said holder being movable through said open end from a position in said casing in which the imperforate end of the holder closes the open end of said casing to a position in which said perforate wall of holder projects into said treating chamber and provides passage for said liquid from said chamber through said holder and filtering material into said casing, and an actuator for moving said holder comprising a cylinder and piston one of which is moved relative to the other by fluid pressure and is operatively connected to said holder, and said casing having an outlet for said filtered liquid.

2. The combination with a chamber in which material is treated for extracting liquid therefrom, an agitator for the material movable in said chamber, and a motor for driving said agitator, of a casing exterior to said treating chamber and having an open end communicating with said chamber, a hollow holder containing filtering material for said liquid and having an imperforate inner end and a perforate wall, means for moving said holder from a position in said casing in which the imperforate end of the holder closes the open end of said casing to a position in which said perforate wall of the holder extends into said treating chamber in the path of movement of said agitator and provides passage for said liquid from said chamber through said holder and filtering material into said casing, said casing having an outlet for said filtered liquid, a safety device controlled by the position of said holder and which stops said motor for preventing operation of said agitator when said perforate wall of said holder extends into said treating chamber.

3. The combination with an extractor having a chamber for treating material for the extraction of liquid therefrom, and a driven agitator for the material in said chamber, of a takeoff strainer containing a filtering body for said liquid and comprising a casing arranged exteriorly and communicating through an opening with said treating chamber, and a hollow member movable from an outer position in said casing out of the path of movement of said agitator to an inner position in which it extends into said treating chamber, said member having a part which in the outer position of said member closes said communication opening, and a perforated part through which said liquid passes from said treating chamber to said filtering body when said member is in said inner position, and a safety device controlled by the position of said member and which prevents operation of said agitator except when said hollow member is in its said outer position out of the path of movement of said agitator.

4. The combination with an extractor having a chamber in which material is treated for the extraction of liquid therefrom, of a take-off strainer for said liquid comprising a casing arranged exteriorly of and communicating through an opening at its inner end with said treating chamber, a hollow strainer member which has a perforated tubular wall and a solid inner end wall and is shiftable endwise through said opening from an outer position in said strainer casing to an inner position in which said perforated wall projects into said treating chamber, said end wall in the inner position of said member closing said communication opening, and the perforations of said tubular wall in the inner position of said member providing passage for the discharge of said liquid from said treating chamber into said strainer casing, said strainer casing having an outlet for the discharge of said liquid from said casing.

5. In an extractor having a chamber in which material is treated for the extraction of liquid therefrom, and a driven agitator in said chamber for the material, the improvement comprising a strainer for said liquid including a casing arranged exteriorly of the and communicating through an opening with said treating chamber, a hollow holder which contains filtering material for said liquid and is shiftable from an outer position in said casing out of the path of movement of said agitator to an inner position in which it extends into said treating chamber, said holder having a solid inner part which in the outer position of the holder closes said communication opening, and a perforated part which in the inner position of the holder projects a substantial distance into the treating chamber and through which said liquid passes from said treating chamber into the filtering material in said holder, and an outlet for the discharge of the liquid from said filtering material and strainer casing.

6. In an extractor having a chamber in which material is treated for the extraction of liquid therefrom and a driven agitator in said chamber for said material, the improved construction comprising a strainer for said liquid including a casing arranged exteriorly of and communicating through an opening with said treating chamber, a hollow holder containing filtering material for said liquid and having a solid inner end wall and a perforated tubular wall, said holder being shiftable from an outer position within said strainer casing and out of the path of movement of said agitator to an inner position extending into said treating chamber, said inner end wall in the outer position of the holder closing said communication opening, and said perforated wall in the inner position of said holder extending into said treating chamber and providing passage for said liquid from said treating chamber into the filtering material in said holder, said strainer casing having a chamber communicating through the perforations in the outer portion of said tubular wall with said filtering material and having an outlet therefrom for the discharge of the filtered liquid.

7. An extractor combination comprising an extractor chamber having a centrally positioned rotatable shaft with agitator blades attached thereto within the chamber, a discharge outlet and conduit leading from the lower portion of said extractor, and a filter-valve structure, movably positioned in said outlet and conduit and comprising a tube having a perforated wall and having an imperforate end section with a closure, said tube slidingly fitted into the discharge conduit whereby when the extraction and agitation are being carried out the imperforate end section is brought into plugging position in said discharge outlet, and the perforations in said tube are brought above said outlet to effect discharge.

8. An extractor combination comprising an extraction chamber with a discharge conduit opening into the lower part of said chamber through a discharge outlet, and a tube in said conduit, filling said outlet and mounted to move in directions into and out of said chamber, the advance end of said tube being imperforate and flush with and closing said outlet against discharge therethrough when the tube is in its retracted position, the side wall of the tube being partially exposed when the tube is advanced into said chamber to discharge position, and at least the part of the tube so exposed in said chamber being perforate to provide a screen through which liquid may be discharged from said chamber when the tube is advanced into said chamber.

9. An extractor combination comprising an extraction chamber with a discharge conduit opening into the lower part of said chamber through a discharge outlet, a tube in said conduit, filling said outlet and mounted to move in directions into and out of said chamber, the advance end of said tube being imperforate and flush with and closing said outlet against discharge therethrough when the tube is in its retracted position, the side wall of the tube being partially exposed when the tube is advanced into said chamber to discharge position, and at least the part of the tube so exposed in said chamber being perforate to provide a screen through which liquid may be discharged from said chamber when the tube is advanced into said chamber, and an element extending into said conduit and operatingly coupled to said tube to advance and retract it.

10. An extractor combination comprising an extraction chamber with a discharge conduit opening into the lower part of said chamber through a discharge outlet, a tube in said conduit filling said outlet and mounted to move in directions into and out of said chamber, the advanced end of said tube being imperforate and flush with and closing said outlet against discharge therethrough when the tube is in its retracted position, the side wall of the tube being partially exposed when the tube is advanced into said chamber to discharge position, and at least the part of the tube so exposed in said chamber being perforate to provide a screen through which liquid may be discharged from said chamber when the tube is advanced into said chamber, and a quantity of small, loose filtering bodies filling said tube to filter liquid discharged through said tube from said chamber.

11. An extractor combination comprising an extraction chamber with a discharge conduit opening into the lower part of said chamber through a discharge outlet, a tube in said conduit, filling said outlet and mounted to move in directions into and out of said chamber, the advance end of said tube being imperforate and flush with and closing said outlet against discharge therethrough when the tube is in its retracted position, the side wall of the tube being partially exposed when the tube is advanced into said chamber to discharge position, and at least the part of the tube so exposed in said chamber being perforate to provide a screen through which liquid may be discharged from said chamber when the tube is advanced into said chamber, an element operatingly coupled to said tube, and a motor connected to said element for reciprocating it and said tube between said positions.

12. An extractor combination comprising an extractor chamber having a centrally positioned rotatable shaft with agitator blades attached thereto within the chamber, a discharge outlet and conduit leading from the lower portion of said extractor chamber, a filter valve structure movably disposed in said conduit and filling said outlet, and including a tube with a perforated screen side wall and an imperforate advance end wall, said tube being movable into said chamber from an outlet-closing position in which the imperforate end closes said outlet to a filter position in which it extends into said chamber and exposes said screen side wall within said chamber, said tube being open into said conduit while extending into said chamber, a power device controlling the rotation of said shaft, an operating member operatingly coupled to said tube and extending to the exterior of said conduit for causing movement of said tube between its said positions, and a safety element controlled by said member and in turn controlling said power device for preventing operation of said shaft while said tube is out of its outlet-closing position.

13. An extractor combination comprising an extraction chamber with a discharge conduit opening into the lower part of said chamber through a discharge outlet, a tube in said conduit, filling said outlet and mounted to move in directions into and out of said chamber, the advance end of said tube being imperforate and flush with and closing said outlet against discharge therethrough when the tube is in its retracted position, the side wall of the tube being partially exposed when the tube is advanced into said chamber to discharge position, and at least the part of the tube so exposed in said chamber being perforate to provide a screen through which liquid may be discharged from said chamber when the tube is advanced into said chamber, an element extending into said conduit and operatingly coupled to said tube to advance and retract it, and a fluid actuated motor coupled to said element for operating it.

FORREST C. SIMON.

REFERENCES CITED

The following references are of record in the file of this patent:

UNITED STATES PATENTS

| Number | Name | Date |
|---|---|---|
| 550,506 | Holthaus | Nov. 26, 1895 |
| 999,532 | Watters | Aug. 1, 1911 |